(12) United States Patent
Mackenzie et al.

(10) Patent No.: US 11,104,244 B2
(45) Date of Patent: Aug. 31, 2021

(54) METHOD FOR CHARGING A PLUG-IN ELECTRIC VEHICLE VIA ANOTHER PLUG-IN ELECTRIC VEHICLE

(71) Applicant: Ford Global Technologies, LLC, Dearborn, MI (US)

(72) Inventors: Kevin Mackenzie, Canton, MI (US); Jonathan Barker, Ann Arbor, MI (US); Liam West, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 284 days.

(21) Appl. No.: 16/383,372

(22) Filed: Apr. 12, 2019

(65) Prior Publication Data
US 2020/0324665 A1    Oct. 15, 2020

(51) Int. Cl.
| | |
|---|---|
| *B60L 53/63* | (2019.01) |
| *B60L 53/16* | (2019.01) |
| *B60L 53/62* | (2019.01) |
| *H02J 7/04* | (2006.01) |
| *H02M 7/797* | (2006.01) |
| *H02J 7/00* | (2006.01) |
| *H02M 3/335* | (2006.01) |

(52) U.S. Cl.
CPC .............. *B60L 53/63* (2019.02); *B60L 53/16* (2019.02); *B60L 53/62* (2019.02); *H02J 7/007* (2013.01); *H02J 7/042* (2013.01); *H02M 3/33584* (2013.01); *H02M 7/797* (2013.01)

(58) Field of Classification Search
CPC .......... B60L 53/63; B60L 53/16; B60L 53/62; B60L 53/20; B60L 2210/10; B60L 2210/30; B60L 53/22; B60L 53/57; B60L 53/53; B60L 53/14; H02J 7/042; H02J 7/007; H02J 2310/48; H02J 7/0045; H02J 7/342; H02J 7/00034; H02M 7/797; H02M 3/33584; H02M 2001/007; H02M 1/4208; H02M 1/14; H02M 1/12; H02M 2001/0058; Y02T 90/14; Y02T 90/12; Y02T 10/7072; Y02T 10/70

See application file for complete search history.

(56) References Cited

U.S. PATENT DOCUMENTS

| | | | |
|---|---|---|---|
| 9,114,714 B2 * | 8/2015 | Pham ...................... | B60L 58/21 |
| 9,193,274 B2 * | 11/2015 | Pursifull ................. | B60L 53/65 |
| 9,260,024 B1 | 2/2016 | Lau | |
| 9,266,438 B2 | 2/2016 | Power et al. | |
| 9,821,669 B2 * | 11/2017 | Tanabe ................ | H02J 7/00036 |
| 9,937,805 B2 * | 4/2018 | Lee .......................... | B60L 58/12 |
| 9,963,038 B2 * | 5/2018 | Parra Ortiz ......... | B60L 11/1816 |
| 9,994,111 B2 * | 6/2018 | Stegmueller ............ | B60L 15/20 |
| 10,075,004 B2 * | 9/2018 | Yang ....................... | B60L 53/20 |
| 10,363,824 B1 * | 7/2019 | Lumpkin .............. | H02J 7/0042 |

(Continued)

*Primary Examiner* — Nha T Nguyen
(74) *Attorney, Agent, or Firm* — David B. Kelley; Brooks Kushman P.C.

(57) ABSTRACT

A system for a vehicle includes a bidirectional power converter, a vehicle controller configured to, in response to a pilot signal indicating a connection to a charging station, cause the converter to initiate power flow from the station to the vehicle, and an electric vehicle supply equipment (EVSE) controller configured to, in response to detecting a connection to another vehicle, generate the pilot signal to cause the converter to generate power to transfer to the another vehicle.

13 Claims, 6 Drawing Sheets

(56) References Cited

U.S. PATENT DOCUMENTS

| | | | | |
|---|---|---|---|---|
| 10,798,542 | B2* | 10/2020 | Mizutani | B60L 53/36 |
| 2012/0286720 | A1* | 11/2012 | Fassnacht | B60L 50/62 |
| | | | | 320/105 |
| 2013/0175973 | A1* | 7/2013 | Jones | B60L 3/0046 |
| | | | | 320/105 |
| 2013/0264995 | A1* | 10/2013 | Lee | B60L 50/51 |
| | | | | 320/104 |
| 2014/0089064 | A1 | 3/2014 | Hyde et al. | |
| 2014/0184141 | A1* | 7/2014 | Loftus | B60L 3/00 |
| | | | | 320/104 |
| 2015/0251550 | A1* | 9/2015 | Stegmueller | B60L 7/14 |
| | | | | 320/105 |
| 2016/0138980 | A1* | 5/2016 | Jefferies | G01K 13/00 |
| | | | | 374/141 |
| 2016/0368390 | A1* | 12/2016 | Yang | B60L 1/003 |
| 2018/0086212 | A1* | 3/2018 | Dudar | B60L 53/12 |
| 2018/0170198 | A1* | 6/2018 | Yang | B60L 53/16 |
| 2019/0001833 | A1* | 1/2019 | Coburn | H02J 7/342 |
| 2019/0047427 | A1* | 2/2019 | Pogorelik | B60L 53/665 |
| 2019/0165591 | A1* | 5/2019 | Kisacikoglu | H02J 7/342 |
| 2019/0217732 | A1* | 7/2019 | Zhou | B60L 53/14 |
| 2020/0184499 | A1* | 6/2020 | Lee | G06F 16/9035 |

* cited by examiner

METHOD FOR CHARGING A PLUG-IN ELECTRIC VEHICLE VIA ANOTHER PLUG-IN ELECTRIC VEHICLE

TECHNICAL FIELD

The present disclosure relates to systems and methods for charging a plug-in electric vehicle via another plug-in electric vehicle.

BACKGROUND

A high voltage battery in an electrified vehicle may be recharged using either alternating current (AC) or direct current (DC) charging. The vehicle may be connected to an AC power grid and receive electric energy via AC Level 1 or AC Level 2 charging using a 120-volt (V) or 240-V connection, respectively. A connection to a DC charge-capable charging station may allow for recharging of the high voltage battery at various current rates, such as DC Level 1 200-450 V/80 amperes (A), DC Level 2 200-450 V/200 A, DC Level 3 200-450 V/400 A, and so on.

SUMMARY

A system for a vehicle includes a bidirectional power converter, a vehicle controller configured to, in response to a pilot signal indicating a connection to a charging station, cause the converter to initiate power flow from the station to the vehicle, and an electric vehicle service equipment (EVSE) controller configured to, in response to detecting a connection to another vehicle, generate the pilot signal to cause the converter to generate power to transfer to the another vehicle.

A method for a vehicle includes, responsive to a pilot signal indicating a connection to a charging station, cause a bidirectional converter to initiate power flow from the station to the vehicle; and responsive to detecting a connection to another vehicle, generate the pilot signal to cause the converter to generate power to transfer to the another vehicle.

A system for a vehicle includes a bidirectional converter, and a pair of switches configured to, in a first position, connect a charge port of the vehicle to a first controller that causes the converter to initiate power flow from a charging station to the vehicle in response to a pilot signal indicating a connection to a charging station, and in a second position, connect the port to a second controller that generates the pilot signal to cause the converter to transfer power to another vehicle in response to a proximity signal indicating a connection to the another vehicle.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

When a vehicle powered by internal combustion runs out of fuel, it may be easily refueled with a small amount of fuel to get it moving again. On the other hand, a hybrid electric vehicle (HEV), a battery electric vehicle (BEV), or another vehicle equipped with a high voltage traction battery that runs out of electric charge may be difficult to recharge without access to a charging station or another utility power source.

In some instances, a charging port on a typical plug-in HEV or BEV may be used to charge another vehicle. For example, a donor vehicle user may activate a "Jumper Mode" of operation, e.g., by pressing a corresponding button, issuing a corresponding voice command, and so on, wherein the "Jumper Mode" indicates that the vehicle may be configured to transfer electrical energy or power to an off-board device or to another vehicle. Following initiation of energy transfer, the donor vehicle charge transfer system may be configured to transfer energy until charging is either interrupted, i.e., due to a charging cable having been unlatched or removed, occurrence of an electrical or data transmission error, a command is issued to stop energy transfer, or until stored energy level on the donor vehicle or the receiving vehicle falls below or reaches a predefined level.

In some instances, a charging system of an HEV or BEV may include a power converter, such that, during charging, AC power may be transferred from an external (e.g., off-board) AC charging source to a traction battery of the vehicle. In some other instances, the received AC power may be converted within a power inverter and/or through an electrically isolated DC-DC converter to condition the received power for transfer to the traction battery. In still other instances, the charger of the vehicle may be configured to operate bidirectionally, in that one or more switching components of the power converter of the charger may be configured to operate in reverse to transfer energy from the traction battery to an off-board vehicle or device.

The vehicle receiving energy from a traction battery of a donor vehicle may be configured to interpret the connection to the donor vehicle as a typical AC input, such as, but not limited to, a conventional residential or commercial charging station. In one example, the donor vehicle may be configured to transfer energy to the receiving vehicle at a rate approximately corresponding to that of a 10-kW charging station. Accordingly, after about five minutes of energy transfer by the donor vehicle to the receiving vehicle, the receiving vehicle that consumes 333 Wh/mi may be able to travel 2.5 miles on the obtained electrical charge. Further, a longer charge time may cause an increased amount of energy to be transferred to the receiving vehicle, thereby, permitting the receiving vehicle to travel farther on the charge received from the donor vehicle.

Figure 1:
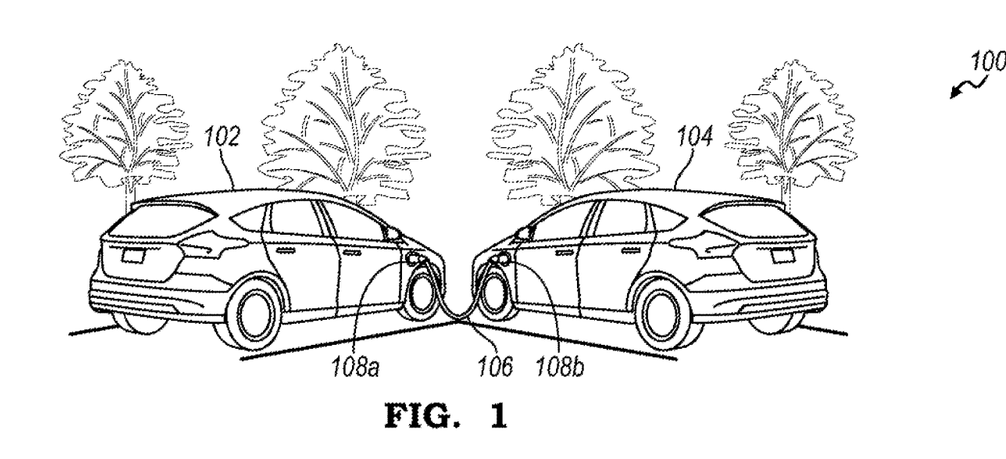
FIG. 1 is a block diagram of a vehicle charge transfer system.

FIG. 1 illustrates an example energy transfer system 100 between vehicles 102, 104. In one example, the vehicles 102, 104 may be HEVs and may include at least one electric machine capable of operating as one or both of an electric motor and generator, a traction battery, an engine, and a multiple-ratio automatic transmission. An inverter may provide bidirectional energy transfer between the electric machine and the traction battery by converting high voltage DC output provided by the traction battery to a three-phase AC as may be required for proper functionality of the electric machine or vice versa. In addition to providing energy for propulsion, the traction battery may provide energy for other vehicle electrical components, such as one or more compressors and electric heaters. One or more vehicle controllers of the vehicle 102, 104 may be configured to monitor and control operation of one or more corresponding vehicle components, including, but not limited to, the engine, the traction battery, and the transmission.

Each of the vehicles 102, 104 may be configured to connect to an AC or DC power source to receive power therefrom to charge the traction battery. In an example, the vehicles 102, 104 may each connect to a charging station, an off-board electric vehicle service equipment (EVSE), and so on.

Additionally or alternatively, the vehicle 102 may be configured to connect to the vehicle 104 to transfer battery energy from the vehicle 102 to the vehicle 104. For example, a charging cable 106 may connect to corresponding charge ports of the vehicles 102, 104 to transfer charge energy therebetween, such as via electrical connector terminals that mate with corresponding recesses of each of the ports. In such an example, the vehicle that supplies battery energy, i.e., the vehicle 102, may be said to be a donor vehicle and the vehicle that receives the supplied battery energy, i.e., the vehicle 104, may be said to be a receiving vehicle. While the vehicle 102 is described as being the donor vehicle and the vehicle 104 is described as the receiving vehicle, the disclosure is not so limited. In some instances, a direction of energy transfer between the vehicles 102, 104 may be reversed, such that the vehicle 102 is the vehicle receiving energy and the vehicle 104 is the vehicle supplying battery energy and so on.

The charge cable 106 and charge ports used to transfer energy from the vehicle 102 to the vehicle 104 may be same or different as a cable and ports used to connect to the off-board EVSE and may comport with one or more industry standards for automotive environment energy transfer. In some instances, in response to being connected to the vehicle 104, the vehicle 102 may be configured to operate in a "Jumper Mode" to generate signals to communicate to the vehicle 104, such that the vehicle 104 perceives the vehicle 102 as the off-board EVSE. As an example, the "Jumper Mode" of the vehicle 102 may be user-activated via a corresponding menu selection or command, e.g., on a touch-screen interface or another human machine interface (HMI), using a voice command, a button control, and some combination thereof. In other examples, the vehicle 102 may enter the "Jumper Mode" operating mode in response to detecting a connection to another vehicle 104.

Figure 2:
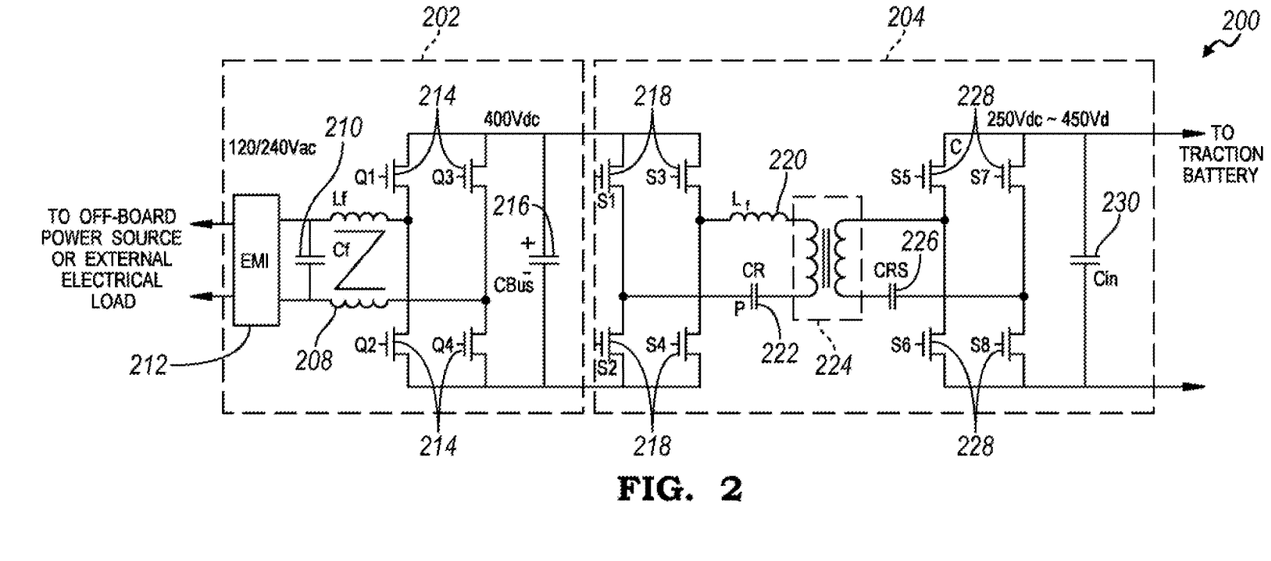
FIG. 2 is a schematic block diagram illustrating a bidirectional power converter.

FIG. 2 illustrates an example bidirectional power converter 200. In one example, the donor vehicle 102 equipped with the converter 200 may be configured to recharge the traction battery via a connection to a power grid. Each of the donor and receiving vehicles 102, 104 may, for example, be configured to selectively connect to off-board EVSE, e.g., a charging station, to coordinate the charge transfer from the power grid to the traction battery of the corresponding vehicle 102, 104. Additionally or alternatively, the converter 200 may enable the donor vehicle 102 to transfer charge energy from the traction battery of the vehicle 102 to charge the traction battery of the receiving vehicle 104.

The converter 200 may condition the power supplied to the vehicle 102 to provide the proper voltage and current levels to the traction battery. The converter 200 may be configured to convert AC energy to DC energy suitable for charging the traction battery. In one example, the control logic of the converter 200 may be configured to control one or more power (conditioning and/or conversion) stages of the converter 200 to enable energy transfer to the traction battery. In response to detecting, for example, that the vehicle 102 has been connected to the EVSE, the control logic of the converter 200 may transmit a signal to the battery controller indicative of a request to charge the traction battery. The battery controller may then command to open or close one or more switches, e.g., the positive and negative main contactors, enabling the transfer of electric energy between the EVSE and the traction battery. In some instances, one or more power stages of the charger 200 may be represented using active and/or passive electrical circuit components, programmable devices, or other implements.

The converter 200 receives AC electrical energy from the AC power source, for example, via the charge port of the vehicle 102. The converter 200 includes an electromagnetic interference filter 212, a power factor correction (PFC) circuit, a bidirectional AC-DC converter 214, and a DC link capacitor 216. The AC-DC converter 214 may include a plurality of high-frequency switches 214a-d, e.g., MOSFETs, IGBTs, and/or BJTs, arranged in a full-bridge configuration. When the energy flows from the AC source to the vehicle 102, the control logic of the converter 200 may alternate operating pairs of the switches 214 to charge the DC link capacitor 216. In one example, the phase shift introduced between the on and off commands by the control logic of the converter 200 to each of the pairs of switches 214 enables the DC link capacitor 216 to produce a substantially constant output voltage level.

Once charged, the DC link capacitor 216 provides electrical energy to a next power stage of the converter 200 when one pair of the switches 214 is closed. Additionally or alternatively, when the energy flows from the traction battery to an off-board electrical load, such as the receiving vehicle 104, the control logic of the converter 200 may alternate operating pairs of the switches 214 of the AC-DC converter 214 to discharge the DC link capacitor 216 and invert the DC output power to AC for transfer to the receiving vehicle 104.

The converter 200 may include a bidirectional DC-DC converter 204 configured to transfer power to the traction battery. In one example, the DC-DC converter 204 may be a dual active bridge isolated DC-DC converter equipped with a ferrite-core transformer 224 configured to provide galvanic isolation between the AC power source and the traction battery. In one example, a primary bridge 218 of the DC-DC converter 204 may include a plurality of high frequency switches 218a-d, e.g., MOSFETs, IGBTs, and/or BJTs, arranged in a full-bridge configuration on a primary side 232a of the transformer 224. As another example, a secondary bridge 228 of the DC-DC converter 204 may include a plurality of high frequency switches 228a-d, e.g., MOSFETs, IGBTs, and/or BJTs, arranged in a full-bridge configuration on a secondary side 232b of the transformer 224.

The control logic of the converter 200 may be configured to command the plurality of high frequency switches 218a-d on and off using complimentary square-wave pulses, such that the switches 218a, 218c are switched (or driven) 50% cycle and 180 degrees out of phase with each other and the switches 218b, 218d are also switched at 50% duty cycle and 180 degrees out of phase with each other. Likewise, the control logic of the converter 200 may be configured to command the plurality of high frequency switches 228a-d on and off using complimentary square-wave pulses, such that the switches 228a, 228c are switched (or driven) 50% cycle and 180 degrees out of phase with each other and the switches 228b, 228d are also switched at 50% duty cycle and 180 degrees out of phase with each other.

The primary and secondary bridges 218, 228 may each be identified as a leading bridge or a lagging bridge depending on a phase-shift applied to the secondary bridge 228, thereby, determining a direction of power flow as being to or from the traction battery. In one example, shifting pulses to the secondary bridge 228 by +δ, such that the primary bridge 218 is a leading bridge and the secondary bridge 228 is a lagging bridge, may cause power to flow to the traction battery. In another example, phase-shifting pulses to the secondary bridge 228 by −δ, such that the secondary bridge 228 is a leading bridge and the primary bridge 218 is a lagging bridge, may cause power to flow from the traction battery.

An inductor 220 and capacitors 222, 226 may define a resonant tank and may be configured to control leakage inductance of the transformer 224 thereby providing resonance operation of the transformer 224 with capacitance of the switches 218a-d and facilitating zero voltage switching (ZVS). While not illustrated in FIG. 2, in some instances, the converter 200 may further include a rectifier bridge configured to convert AC input voltage transferred to the vehicle 102 into DC output voltage for charging the traction battery. As one example, the rectifier bridge may include a plurality of diodes connected in series pairs such that during a positive half cycle of the input voltage a first pair of diodes is conducting while a second pair of diodes is reverse biased and during a negative half cycle the second pair of diodes is conducting and the first pair of diodes is reverse biased.

In some other instances, the converter 200 may include power factor correction, such as an interleaved PFC circuit that is configured to reduce input current harmonics, such as input current ripple amplitude, to improve a power factor and increase efficiency of the charger 200. An example interleaved PFC circuit includes a two-cell interleaved boost converter having inductors, a pair of high frequency switches, and diodes. In one example, the control logic of the charger 200 may operate the switches with the same duty ratio, e.g., 50%, but time interleaved, i.e., with a relative phase shift of 180 degrees introduced between the on/off commands to each of the switches. Accordingly, when a given switch is closed, the electric energy flowing through an inductor connected to that switch generates a magnetic field causing the inductor to store energy and, when that switch is open, the inductor charges the DC link capacitor 216 via a diode and so on. In some instances, phase-shifting the on and off commands issued to each of the switches may reduce ripple in the output current of the inductors connected thereto.

Figure 3:
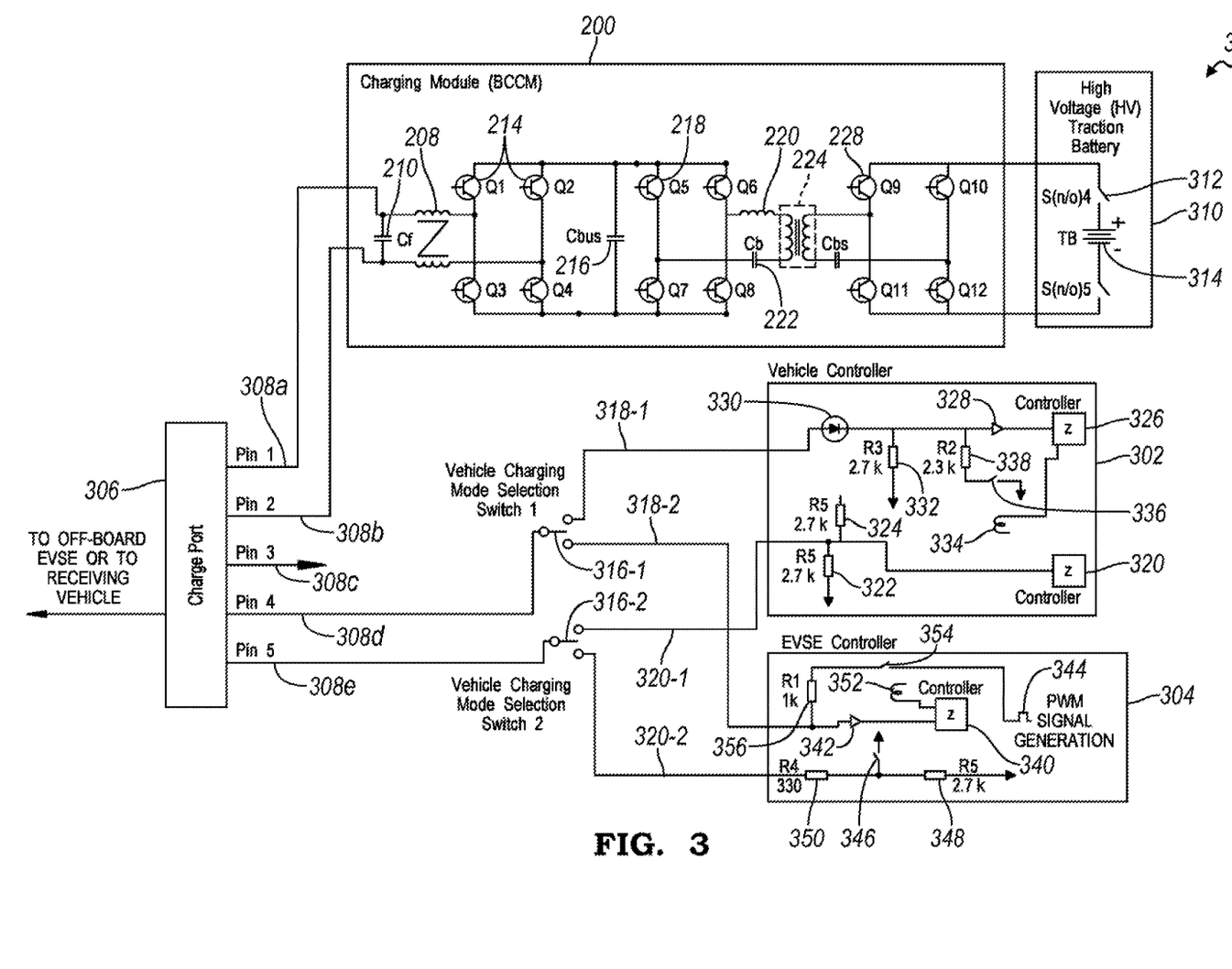
FIG. 3 is a block diagram illustrating a bidirectional power transfer system.

FIG. 3 illustrates an example charging system 300 of the vehicle 102. The system 300 may include the converter 200 connected between a charging connector port 306 and a traction battery 310, the converter 200 being configured to transfer energy to charge the traction battery 310 and to transfer energy from the traction battery 310 to another electrical load, such as, the receiving vehicle 104. The traction battery 310 may comprise a plurality of battery cells 314, e.g., electrochemical cells, electrically connected to a plurality of connectors and switches 312 enabling and disabling the supply and withdrawal of electric energy to and from the battery cells 314. The plurality of connectors and switches 312 may be electrically operated switches, relays, or other electric, electronic, or electromagnetic components configured to selectively establish, interrupt, or divert current flow between one or more portions of the traction battery 310 and other vehicle components. An example of an electrically controlled switch 312 configured to operate in an HEV is a high voltage contactor. While not separately illustrated, a battery controller may be configured to monitor and control operation of the traction battery 310, such as by controlling the plurality of connectors and switches 312, e.g., contactors, of the traction battery 310 to connect or disconnect the traction battery 310 from other vehicle 102, 104 components.

The port 306 of the vehicle 102 may be configured to receive a charge cable connector further connected either to the EVSE or to the receiving vehicle 104. For example, the port 306 may include a plurality of recesses that mate with corresponding connector pins of the cable connector and so on. The port 306, the cable connector, and the EVSE may be configured to comply with industry standards pertaining to electrified vehicle charging, such as, but not limited to, Society of Automotive Engineers (SAE) J1772, J1773, J2954, International Organization for Standardization (ISO) 15118-1, 15118-2, 15118-3, the German DIN Specification 70121, and so on. The vehicle 102 may be configured to receive one or more power types, such as, but not limited to, single- or three-phase AC power and DC power. The vehicle 102 may be configured to receive different levels of AC and DC voltage including, but not limited to, Level 1 120-volt (V) AC charging, Level 2 240-V AC charging, Level 1 200-450 V and 80 amperes (A) DC charging, Level 2 200-450 V and up to 200 A DC charging, Level 3 200-450 V and up to 400 A DC charging, and so on.

A pair of electrical terminals of the port 306 may be selectively connected to a vehicle controller 302 or to an EVSE controller 304. In one example, a pair of switches 316-1 and 316-2 may operate in a default position to connect the port 306 to the vehicle controller 302. As another example, in response to a predefined signal or command, the switches 316-1 and 316-2 may be commanded to change position to disconnect the vehicle controller 302 and the charge port 306 and to connect the port 306 to the EVSE controller 304. For instance, the switches 316-1 and 316-2 may connect the EVSE controller 304 to the port 306 in response to activation of the "Jumper Mode" of the vehicle 102 resulting from a user menu selection or command, e.g., on a touch-screen interface or another HMI, a user voice command, a user button control selection, or some combination thereof. In other examples, the vehicle 102 may enter the "Jumper Mode" operating mode in response to detecting a connection to another vehicle 104.

The vehicle controller 302, when connected to the port 306, may operate the converter 200 to transfer power received at the port 306 to the traction battery 310 of the vehicle 102. Additionally or alternatively, the EVSE controller 304, when connected to the port 306, may operate the converter 200 to transfer power from the traction battery 310. In some instances, power delivered to the vehicle 102 may be from an off-board EVSE and power transferred from the donor vehicle 102 may be transferred to another vehicle, e.g., receiving vehicle 104. Furthermore, in response to being connected to the receiving vehicle 104, the EVSE controller 304 may be configured to operate in a "Jumper Mode" to generate signals to communicate to the receiving vehicle 104, such that the receiving vehicle 104 perceives the donor vehicle 102 as an off-board EVSE.

In one example, the recesses of the port 306 may include a plurality of terminals 308. A pair of terminals 308a, 308b may be power terminals configured to transfer power to and from the traction battery 310, a terminal 308c may be a ground connection terminal, a terminal 308d may be a pilot control signal terminal, and a terminal 308e may be a proximity detection terminal. Ports with more or fewer terminals with same or different electrical functionalities are also contemplated.

The donor and receiving vehicles 102, 104 may exchange one or more signals, e.g., "handshake" signals, before, during, and after a given charging session. The signals between the donor and receiving vehicles 102, 104 may be indicative of detecting a charging connection status, energy transfer status, energy transfer amount, permitted maximum transfer current rate, and so on.

Figure 4A:
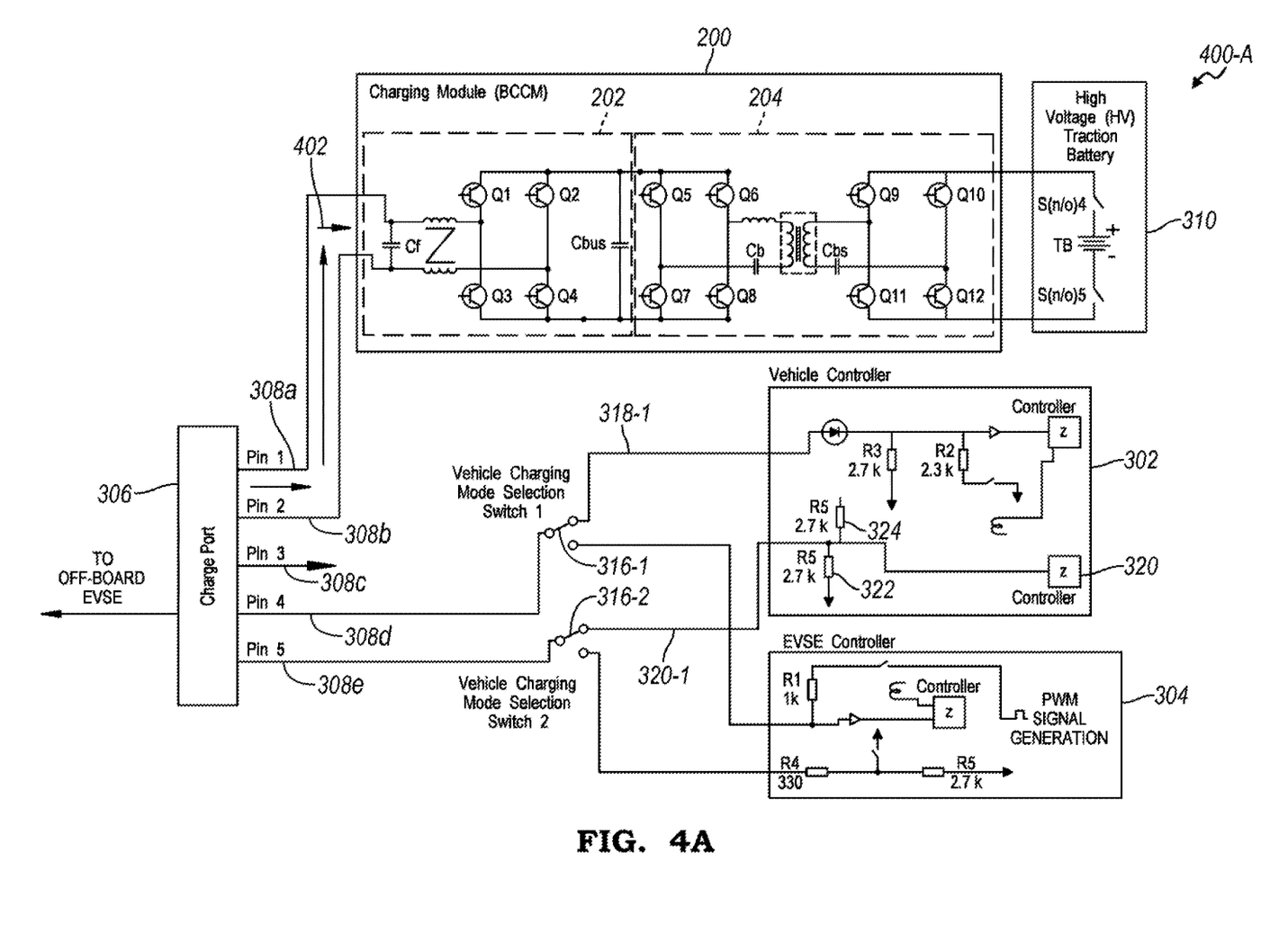
FIG. 4A is a block diagram illustrating charge energy transfer to a vehicle.

FIG. 4A illustrates an example energy transfer system 400-A for the vehicle 102. A first switch 316-1 may be in a first position to connect a pilot signal circuit line 318-1 of the vehicle controller 302 to the pilot signal terminal (pin) 308d of the charge port 306. A second switch 316-2 may be in a first position to connect a proximity detection circuit line 320-1 of the vehicle controller 302 to the proximity detection terminal (pin) 308e of the charge port 306. The respective first positions of each of the switches 316-1 and 316-2 may be default positions. Additionally or alternatively, the switches 316-1, 316-2 may be commanded into their respective first positions in response to a corresponding signal from the converter 200, user input selection, and so on.

A proximity signal detected on the proximity detection terminal 308e may be a resistance-based signal indicative of a state of engagement of a charging connector handle of a charging cable extending from the off-board EVSE to the vehicle 102. The proximity detection circuit of the vehicle controller 302 may include a pair of resistors 322, 324 connected in parallel and a proximity control logic circuit 320. In response to the charging connector of the off-board EVSE being connected to the port 306 of the vehicle 102 and, thus, being connected to the resistors 322, 324, resistance of the proximity detection terminal 308e may change indicating that the charging connector has been fitted into and latched to the port 306. In response to the vehicle 102 being connected to the off-board EVSE, the vehicle controller 302 may establish communication with a corresponding controller of the off-board EVSE to coordinate the delivery of power from the off-board EVSE to the vehicle 102.

In one example, responsive to a confirmation that the charging handle has been inserted and locked in place, the vehicle controller 302 may communicate with a corresponding controller of the off-board EVSE, e.g., via the pilot control signal terminal 308d, to initiate charging of the vehicle 102. The pilot control signal circuit of the vehicle controller may include a pilot control logic circuit 326 configured to control a pilot coil 334 and a pilot switch 336. The vehicle controller 302 may detect a 12-V pilot signal via the pilot signal terminal 308d indicative of a confirmation that a connection with the off-board EVSE has been made.

In response to a 12-V pilot signal on the pilot signal terminal 308d, the vehicle controller 302 may cause voltage across the pilot signal terminal 308d to change. In one example, the vehicle controller 302 may alter voltage across the pilot signal terminal 308d by placing a load onto the pilot control signal terminal 308e. Responsive to detecting the first voltage drop, the off-board EVSE may generate and transmit a pulse-width modulation (PWM) signal on the pilot control signal terminal 308e. In some instances, a duty cycle of the signal generated by the off-board EVSE may be indicative of a maximum charge current that may be transferred to the vehicle 102.

The off-board EVSE may then command closed high voltage contactors or other switches to enable flow of power from the utility power grid or another power source to the vehicle 102 connected to the off-board EVSE. In response to detecting the PWM signal on the pilot control signal terminal 308e, the vehicle controller 302 may cause high voltage contactors 312 to close to initiate transfer of energy to charge the traction battery 310 of the vehicle 102 via the converter 200. The vehicle controller 102 may initiate charge transfer from the off-board EVSE and may cause a second voltage drop (e.g., by placing a different electrical load) on the pilot control signal terminal 308e indicating that charge transfer to the vehicle 102 has been initiated. The off-board EVSE and the vehicle controller 302 may be configured to interrupt the flow of charge and may cause the respective pairs of contactors of the EVSE and the vehicle 102 to open responsive to an error, malfunction, or to an indication that charging of the traction battery 310 has been completed.

Figure 4B:
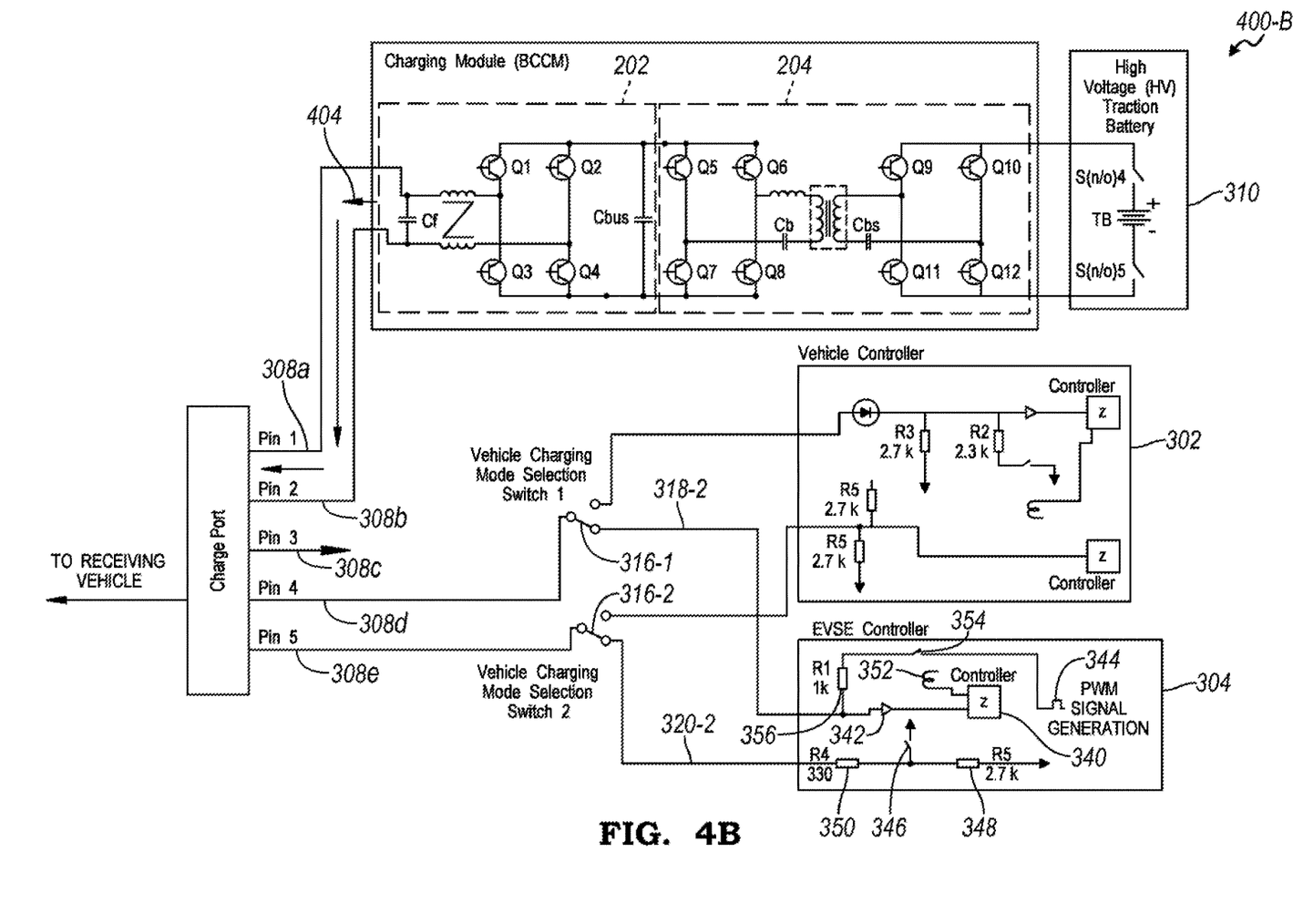
FIG. 4B is a block diagram illustrating charge energy transfer from one vehicle to another.

FIG. 4B illustrates an example vehicle-to-vehicle energy transfer system 400-B. The first switch 316-1 may be in a second position to connect a pilot signal circuit line 318-2 of the EVSE controller 304 to the pilot signal terminal (pin) 308d of the charge port 306. The second switch 316-2 may be in a second position to connect a proximity detection circuit line 320-2 of the EVSE controller 304 to the proximity detection terminal (pin) 308e of the charge port 306. In some instances, the switches 316-1, 316-2 may be commanded into their respective second positions in response to a corresponding signal from the converter 200, user input selection of the "Jumper Mode" operating mode, and so on.

Once the vehicle 102 is connected to the vehicle 104 and/or the "Jumper Mode" of the vehicle 102 has been activated, the EVSE controller 304 may be electrically connected to and in communication with a vehicle controller of the receiving vehicle 104 to coordinate the delivery of power from the donor vehicle 102 to the receiving vehicle 104.

In one example, the EVSE controller 304 may generate a signal in response to detecting, via the proximity detection terminal 308e, that a connection to the receiving vehicle 104 has been made and the "Jumper Mode" activated. The EVSE controller 304 may be configured to detect a state of the charging connector based on the proximity interlock input. A proximity signal detected on the proximity detection terminal 308e may be a resistance-based signal indicative of a state of engagement of a charging connector handle of a charging cable extending from the donor vehicle 102 to the receiving vehicle 104.

The proximity interlock circuit of the EVSE controller 304 may include a switch 346, and a pair of resistors 348, 350, e.g., 150Ω and 330Ω, respectively, integrated into the charging connector that mates with the charge port of the receiving vehicle 104. In one example, when the connector is disconnected, the "pull-up" resistor 350 dominates and the vehicle proximity system may detect that voltage of the proximity circuit is approximately 90% of the reference voltage $V_{ref}$. The receiving vehicle 104 proximity system may interpret the 900% voltage value as indicating that at least one of the ends 108a, 108b of the connector 106 are not inserted into respective ports 306 of the donor vehicle 102 and the receiving vehicle 104, respectively. In another example, when the connector 106 engagement lock is pushed, the resistor 350 may be shunted such that the resistor 348 appears between ground and the proximity pin and voltage of the proximity circuit may be about ⅓ of the reference voltage $V_{ref}$. Once the lock is released and the connector is fully engaged, a series combination of the resistors 348, 350 may appear to ground causing voltage of the proximity circuit to be about ⅔ of the reference voltage $V_{ref}$. While the proximity circuit of the donor vehicle 102 is described above is including a switch and a pair of resistors, other circuit configurations with more or fewer electrical circuit components are also contemplated.

Responsive to a confirmation that the charging handle has been inserted and locked in place, the EVSE controller 304 may communicate with the receiving vehicle 104, e.g., via the pilot control signal terminal 308d, to initiate charging of the receiving vehicle 104. The pilot control signal circuit of the EVSE controller 304 may include an EVSE pilot control logic circuit 340 configured to control operation of an EVSE pilot coil 352 and an EVSE pilot relay 354. The logic circuit 340 may further control flow of a PWM signal generated by a PWM signal generator 344 via an EVSE pilot resistor 356 to be transmitted to the on-board charger of the receiving vehicle 104 via the pilot control signal terminal 308d. In one example, the EVSE controller 304 may generate and transmit a 12-V pilot signal via the pilot signal terminal 308d indicative of a confirmation that a connection with the receiving vehicle 104 has been made. The EVSE controller 304 thus acts to indicate to the receiving vehicle 104 that the receiving vehicle is connected to a charging station rather than a vehicle.

The charge controller of the receiving vehicle 104 may cause a first voltage drop on the pilot signal terminal 308d responsive to the 12-V signal generated by the EVSE controller 304 of the donor vehicle 102. The EVSE controller 304 may be configured to, responsive to the first voltage drop, to operate the coil 352 and relay 354 to generate and transmit to the receiving vehicle 104 a PWM signal having a predefined duty cycle. In some instances, a duty cycle of the PWM signal generated by the EVSE controller 304 may be indicative of a maximum charge current that may be transferred from the donor vehicle 102. Further, the EVSE controller 304 may cause the contractors 312 of the traction battery 310 to close to enable charge energy transfer from the donor vehicle 102 to the receiving vehicle 104.

In response to the PWM signal from the donor vehicle 102 (perceived by the receiving vehicle 104 as a signal originating from an off-board EVSE), an on-board charger of the receiving vehicle 104 may cause a second voltage drop on the pilot control signal terminal 308e and/or may cause high voltage contactors of the receiving vehicle 104 to close to permit transfer of energy to the receiving vehicle 104. In one example, the on-board charger of the receiving vehicle 104 may initiate charge transfer from the donor vehicle 102 responsive to a duty cycle of the pilot control signal generated by the donor vehicle 102 being greater than a predefined threshold, e.g., greater than a minimum charge current value of the receiving vehicle 104. The second voltage drop of a signal on the pilot control signal terminal 308e may indicate that transfer of charge energy from the traction battery 310 of the donor vehicle 102 to the receiving vehicle 104 has been initiated.

Figure 5:
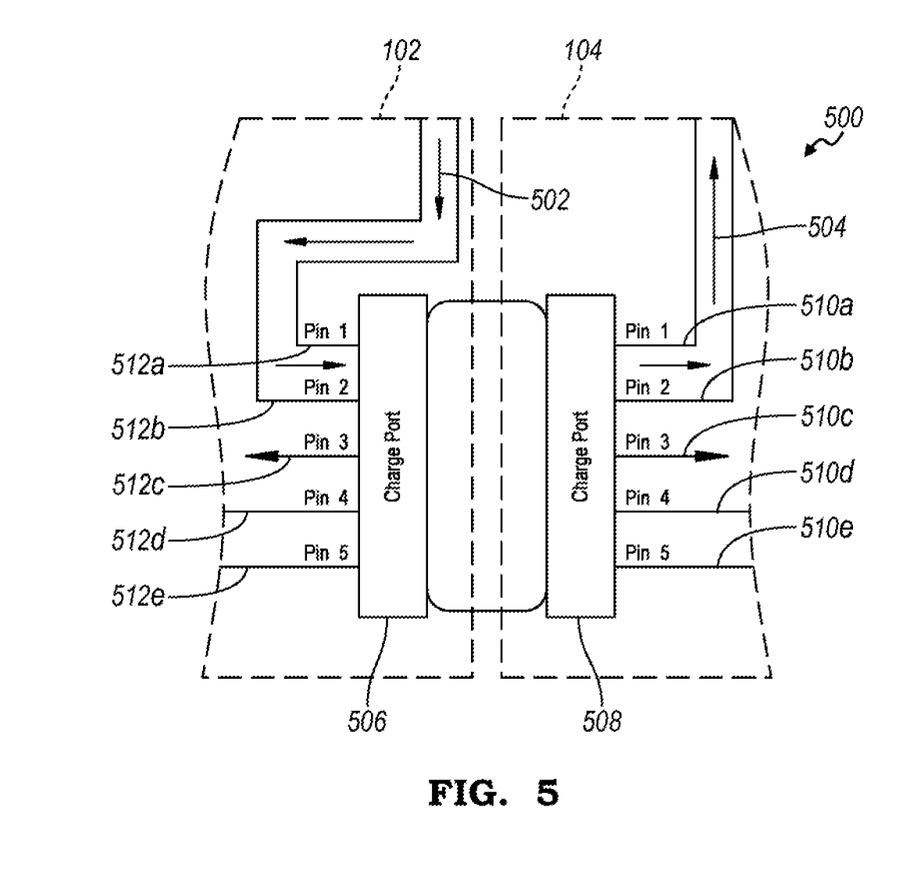
FIG. 5 is a block diagram illustrating a flow of charge energy between two vehicles.

FIG. 5 illustrates a charge energy flow diagram 500 from the donor vehicle 102 to the receiving vehicle 104 via respective charge ports 506, 508. The part ports 506, 508 may be connected together using the connector cable equipped with a pair of connector handles, each handle including terminals with that mate with corresponding recesses of each of the ports 506, 508. As an example, the connector cable 106 and handles 108a, 108b illustrated and described in reference to at least FIG. 1 may be used. Charge energy 502 from the donor vehicle 102 delivered via the converter 200 to voltage lines 512a, 512b may be transferred 504 to a traction battery of the receiving vehicle 104 via corresponding receiving voltage lines 510a, 510b. A connection between the donor and receiving vehicles ports 506, 508 may include, but not limited to, a connection between respective ground terminals (pins) 512c, 510c, pilot control signal terminals (pins) 512d, 510d, and proximity detection circuit terminals (pins) 512e, 510e. Furthermore, during the energy flow in the direction indicated in the diagram 500, the energy may be perceived by the receiving vehicle 104 as originating from an off-board EVSE, thereby, making a connection to the donor vehicle 102 transparent to the receiving vehicle 104.

Figure 6:
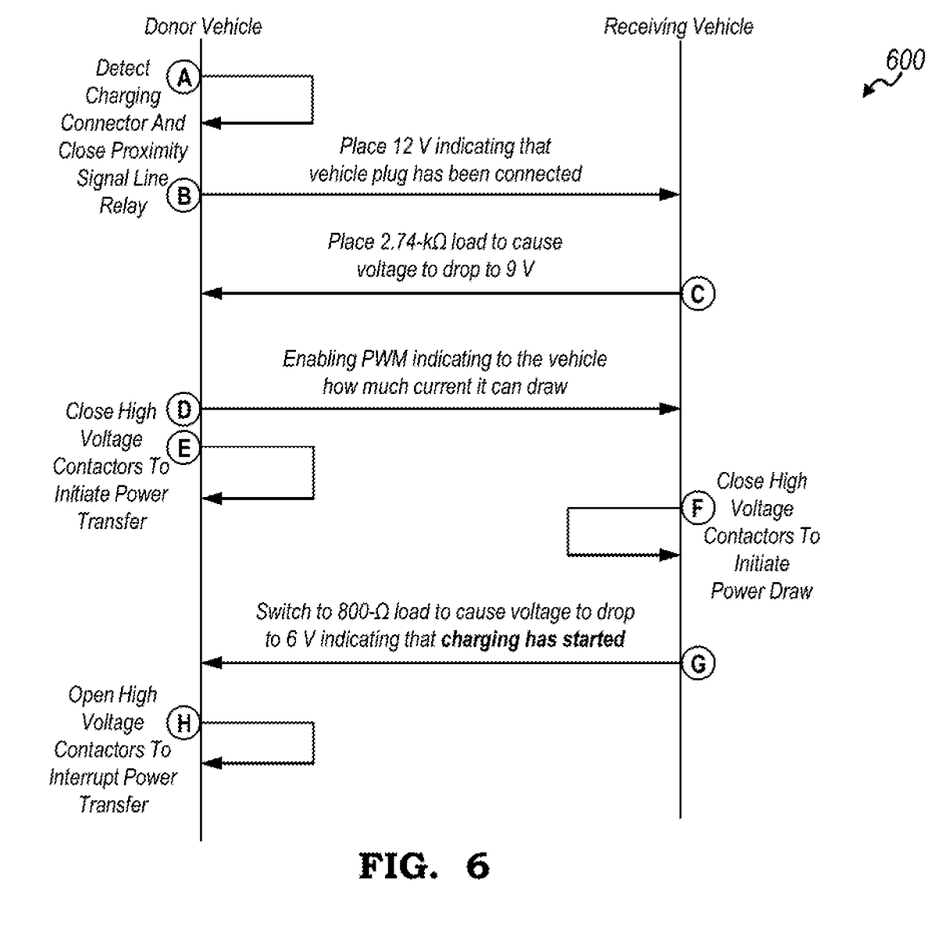
FIG. 6 is a block diagram illustrating a signal flow of pilot control signals.

FIG. 6 illustrates an example signal flow 600 of pilot control signals between the donor vehicle 102 and the receiving vehicle 104 before, during, or after charge energy transfer from the donor vehicle 102 to the receiving vehicle 104. In one example, the signal flow 600 may be activated responsive to the switches 316-1, 316-2 of the donor vehicle 102 being commanded into their respective second positions resulting from a corresponding signal from the converter 200, user input selection of the "Jumper Mode" operating mode, and so on.

The signal flow 600 may begin at time index (A) when the EVSE controller 304 of the donor vehicle 102 detects on the proximity signal terminal 512e that a connection to the charge port 508 of the receiving vehicle 104 has been made. For example, responsive to a confirmation that the charging handles 108a, 108b have been inserted and locked in place of the charging ports 506, 508, the EVSE controller 304 of the donor vehicle 102 may communicate with the receiving vehicle 104 to initiate charging of the receiving vehicle 104.

At time index (B), the EVSE controller 304 of the donor vehicle 102 places 12-V signal on the pilot control signal terminal 512d (detected on the pilot control signal terminal 510d of the receiving vehicle 104) indicating that the receiving vehicle 104 has been connected to an off-board EVSE. Accordingly, the donor vehicle 102 serves as an off-board EVSE to the receiving vehicle 104 for transferring charge energy thereto.

At time index (C), the receiving vehicle may cause a first voltage drop by placing a first load on the pilot control signal terminal 510d (detected on the pilot control signal terminal 512d of the donor vehicle 102), where the first voltage drop indicates that the receiving vehicle 104 is ready to receive charge. At time index (D), the EVSE controller 304 of the donor vehicle 102 may be configured to, responsive to the first voltage drop, to operate the coil 352 and relay 354 to generate and transmit to the receiving vehicle 104 a PWM signal having a predefined duty cycle. In some instances, a duty cycle of the PWM signal generated by the EVSE controller 304 may be indicative of a maximum charge current that may be transferred from the donor vehicle 102. Further, the EVSE controller 304 may cause the contractors 312 of the traction battery 310 to close to enable charge energy transfer from the donor vehicle 102 to the receiving vehicle 104.

At time index (F), an on-board charger of the receiving vehicle 104 may cause high voltage contactors of the receiving vehicle 104 to close to permit transfer of energy to the receiving vehicle 104. At time index (G), an on-board charger of the receiving vehicle 104 may cause a second voltage drop on the pilot control signal terminal 308e indicating that transfer of charge energy from the traction battery 310 of the donor vehicle 102 to the receiving vehicle 104 has been initiated. In one example, the on-board charger of the receiving vehicle 104 may initiate charge transfer from the donor vehicle 102 (perceived by the receiving vehicle 104 as an off-board EVSE) responsive to a duty cycle of the pilot control signal generated by the donor vehicle 102 being greater than a predefined threshold, e.g., greater than a minimum charge current value of the receiving vehicle 104.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A system for a vehicle comprising:
a bidirectional converter; and
a pair of switches configured to,
in a first position, connect a charge port of the vehicle to a first controller of the vehicle that causes the converter to initiate power flow from a charging station to the vehicle in response to a pilot signal from the charging station indicating a connection to the charging station, and
in a second position, connect the charge port to a second controller of the vehicle that generates the pilot signal to cause the converter to transfer power off-board the vehicle in response to a proximity signal indicating a connection off-board the vehicle.

2. The system of claim 1, wherein the bidirectional converter includes primary and secondary converters disposed about a corresponding side of a transformer, each of the primary and secondary converters including a plurality of switches.

3. The system of claim 2, wherein causing power flow to the vehicle includes operating the bidirectional converter using phase-shift modulation such that the primary converter switches are leading and the secondary converter switches are lagging, and causing power flow off-board the vehicle includes operating the bidirectional converter such that the secondary converter switches are leading and the primary converter switches are lagging.

4. The system of claim 1, wherein the pilot signal is further indicative of power status, available power, or charge state.

5. The system of claim 1, wherein the pilot signal is a 1-kilohertz square wave signal.

6. The system of claim 5, wherein a duty cycle of the pilot signal is indicative of a maximum amount of current during power flow and transfer.

7. The system of claim 1, wherein the second controller is further configured to engage a proximity interlock prior to initiating the power flow.

8. The system of claim 1, wherein the bidirectional converter includes an asymmetrical resonant tank.

9. A method for a vehicle, comprising:
in response to a pilot signal from a charging station indicating a connection to the charging station, arranging a pair of switches in a first position to connect a charge port of the vehicle to a first controller of the vehicle that causes a bidirectional converter to initiate power flow from a charging station to the vehicle; and
in response to a proximity signal indicating a connection off-board the vehicle, arranging the pair of switches in a second position to connect the charge port to a second controller of the vehicle that generates the pilot signal to cause the bidirectional converter to transfer power off-board the vehicle.

10. The method of claim 9, wherein the pilot signal is further indicative of power status, available power, or charge state.

11. The method of claim 9, wherein the pilot signal is a 1-kilohertz square wave signal.

12. The method of claim 9, wherein a duty cycle of the pilot signal is indicative of a maximum amount of current during power flow and transfer.

13. The method of claim 9, wherein causing the power flow to the vehicle includes operating the bidirectional converter using phase-shift modulation such that primary converter switches are leading and secondary converter switches are lagging, and wherein causing the power flow to off-board the vehicle includes operating the bidirectional converter such that secondary converter switches are leading and primary converter switches are lagging.

\* \* \* \* \*